3,582,473
METHOD FOR WATER DISTILLATION
William A. Barnstead, 311 Appleton St.,
Arlington, Mass. 02174
Continuation-in-part of application Ser. No. 563,302, July 6, 1966, which is a continuation-in-part of application Ser. No. 280,199, May 14, 1963. This application Mar. 7, 1968, Ser. No. 719,817
Int. Cl. B01d 5/00; C02b 3/00
U.S. Cl. 203—11                                          8 Claims

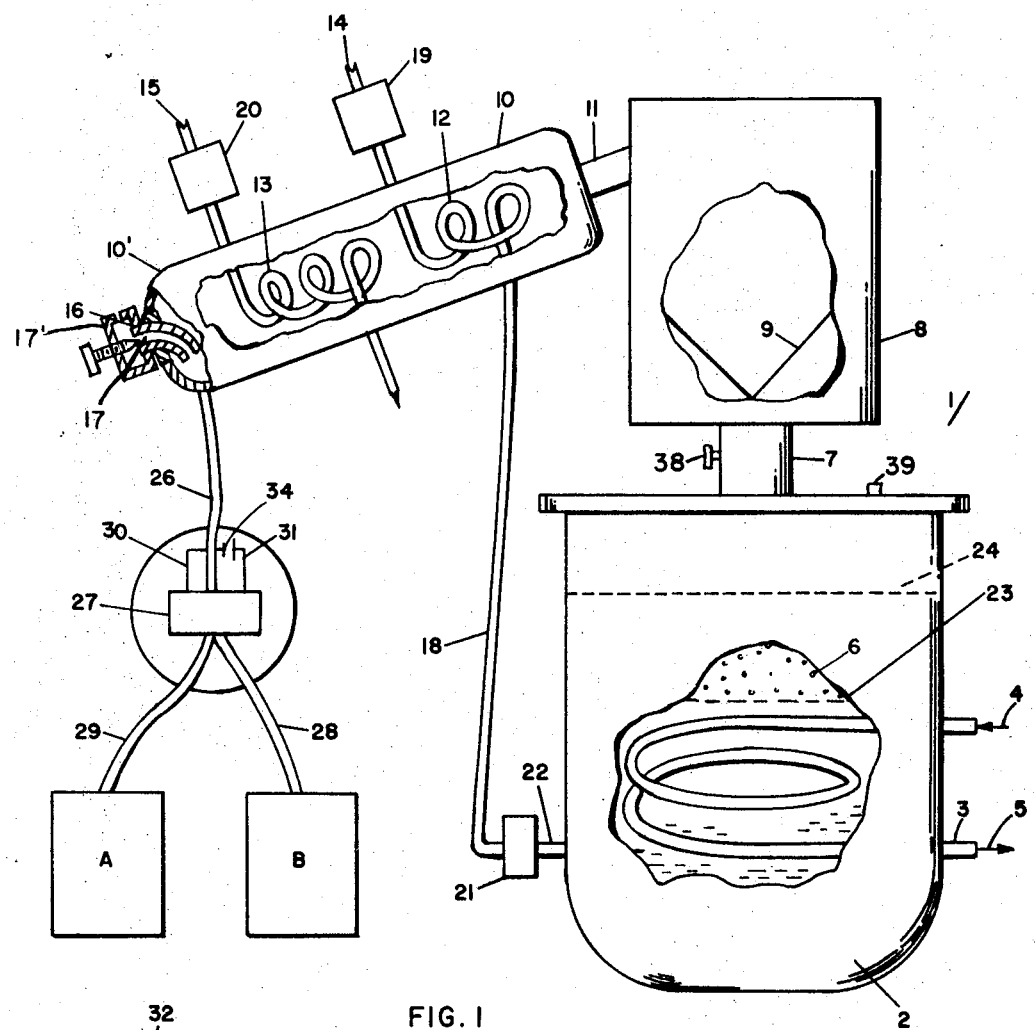
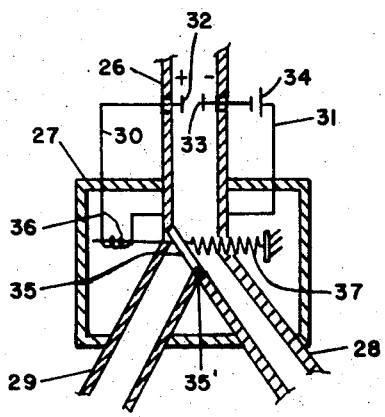
FIG. 1
FIG. 2
INVENTOR.
WILLIAM A. BARNSTEAD
BY Robert Shaw
ATTORNEY

United States Patent Office 3,582,473
Patented June 1, 1971

ABSTRACT OF THE DISCLOSURE

A method of distilling water is disclosed to provide distillate having a purity of the order of 2 million ohm-cm. resistance and above from tap water. The method is particularly directed to prevent gases, as $CO_2$, $NH_3$, $SO_2$ etc., which are generally present in tap water or are extracted from the surrounding atmosphere during the condensing stage in the usual distillation process, from dissolving in the distillate during condensation. To accomplish the desired results the condensing stage disclosed contemplates condensing the water vapor in a vented condenser at a temperature above the environmental boiling point of water with a corresponding pressure above environmental pressure thereby to maintain the flow of gases outward from the condenser and, further, to pevent the unwanted gases from dissolving in the condensate.

---

This application is a continuation-in-part of application Ser. No. 563,302, filed July 6, 1966 (now abandoned), which is a continuation-in-part of application Ser. No. 280,199, filed May 14, 1963 (now abandoned).

The present invention relates to a water still and, more particularly, to a water still that may be used, for example, to provide high purity water having in the vicinity of 2 million ohm-cm. resistance and above by one pass therethrough of tap water or the like.

An increasing awareness in industry and in purely research fields of the need for high purity water has led to the demand for water substantially devoid of impurities, including particulate matter and gases in solution. It has been proposed to provide high purity water from tap water and the like by filtration and ion exchange methods, but these methods while removing some impurities often introduce others. Distillation is used also, but present distillation methods and apparatus do not provide much better than 1 million ohm-cm. resistivity water except by passing the water several times there-through. Other purification systems embody filtration, ion change and distillation, in combination, but such apparatus is inherently complicated and expensive to build, operate and maintain.

An object of the present invention is to provide a water still and method that will by one pass there-through or single distillation provide water having 2 million ohm-cm. resisitivty and above while, nevertheless, eliminating the need for prior complex filtration or ion exchange apparatus.

Another object is to provide a still which may be operated to purify water to the vicinity of 15 million ohm-cm. resistivity by single distillation.

A further object is to provide a method of removing unwanted dissolved gases from tap water and the like, but which, nevertheless, does not introduce inorganic and organic material into the water during such gas removal.

Still another object is to provide a still which may be operated to remove unwanted gases and other impurties from tap water and which will also destroy and then compose living organisms in the water thereby to sterilize the same.

Still further objects will become evident in the description to follow and will be particularly pointed out in the appended claims.

Generally and by way of summary, the objects of the invention are attained by distilling tap water containing unwanted dissolved gases and other impurities at higher temperatures and pressures than have heretofore been used. Distillation is effected by applying heat to the tap water, which is contained in an evaporator section, to change the tap water to a vapor containing $H_2O$ gas and the unwanted gases. Thereafter the $H_2O$ gas is condensed to a liquid at a temperature of substantially between 213° F. and 233° F. at a pressure of substantially between 0.3 and 7.3 pounds per square inch above atmospheric pressure, respectively, and the unwanted gases are expelled to the atmosphere.

The invention will now be described in connection with the accompanying drawing in which FIG. 1 is a side view of an embodiment of the present invention, partially cut away and partly in schematic and block diagram form; and FIG. 2 is an enlarged cross-section view of the encircled elements in FIG. 1.

Referring now to FIG. 1, a water still 1 of the present invention is shown for producing high purity water from, for example, impure tap water and the like. Tap water imprities include particulate matter, including organics and inorganics, and dissolved gases (including $CO_2$, $NH_3$, $SO_2$ and the like), the quantity and type of the impurities varying from geographical area to geographical area. The tap water is introduced into an evaporator section 2 under pressure, as hereinafter discussed. Heat is applied to the water in the lower portion of the evaporator section by a steam coil 3, which receives steam under pressure in at 4 and the steam leaves at 5 (The steam coil 3 may be replaced by an electric heating element or other heat producing means), to raise the temperature of the water to cause it to change to a vapor 6 containing $H_2O$ gas and the unwanted gases, and, often, water droplets, which may contain entrained particulate matter. The vapor passes upward through a connecting pipe 7 to a baffle section 8 disposed above the evaporator section 2 and connected therewith by the pipe 7 to receive the vapor from the evaporator section 2. A baffle 9 causes the water droplets and entrained particles to disengage from the vapor 6 and return to the evaporator section 2; the particles are periodically drained from the lowermost part of the evaporator 2 through a valve, not shown. A condenser 10 is connected by a pipe 11 to receive the vapor, now containing the $H_2O$ gas and the unwanted gases, from the baffle section 8. The condenser 10 contains cooling coils 12 and 13 operable to receive cooling water respectively at 14 and 15 to condense the $H_2O$ gas; tap water from the coil 12 passes under pressure to the evaporator section 2, in a manner later described, the separate coil enabling changes in inflow to the evaporator without changing greatly the rate of condensation.

The vapor in the condenser is a saturated steam vapor; hence, for any particular temperature there exists a corresponding pressure, and any change in temperature results in a like change in pressure in accordance with the laws governing saturated steam vapor. Therefore, the pressure in the condenser may be increased, for example, by reducing the size of an exhaust opening 17 and there is a concomitant increase in temperature; or the temperature may be increased, as by reducing the amount of cooling fluid passing through the coils 12 and 13, and there is a concomitant increase in pressure. In actual practice it has been found most convenient to make the size of the opening 17 adjustable, as by the use of a needle valve 17', to enable maintenance of the desired range of pressures and then control the temperature and pressure within the condenser 10 by controlling the amount of cooling water passing through the cooling coil 13 and, to a lesser extent, the cooling coil 12.

A goose-necked outlet 16, having the opening 17 therethrough, is disposed in the free end 10' of the condenser to enable the venting of the unwanted gases, the gooseneck being rotatable to enable selective venting. The opening 17 is made small enough initially or adjusted to enable the maintenance of the pressure in the condenser 10 of substantially 0.3 to 7.3 pounds per square inch above atmospheric pressure, which is taken at 14.7 pounds per square inch or thereabouts for most locations in which water stills are placed, at a temperature substantially between 213° F. and 233° F. respectively.

It is now in order to discuss the importance of the pressure and temperature values just mentioned. A temperature of substantially between 213° F. and 233° F. is maintained in the condenser, and preferably of substantially 218.5° F. It has been found that when such temperature is maintained there is little tendency for the unwanted gases to dissolve in the condensate. However, when the temperature at which condensation takes place drops much below 213° F., there is a tendency for the unwanted gases to be dissolved in the condensate rather than be expelled to the atmosphere. Conversely, when the temperature within the condenser is maintained much above 233° F., the H$_2$O tends not to condense and little or no distillate is formed. Thus, a temperature of still operation in the range between 213° F. and 233° F. has been found to be very desirable and a temperature of 218.5° F. produces high yield of distillate for a given quantity of evaporated water. And, of course, as the temperature in the condenser is increased, the pressure increases accordingly. Here also, a benefit is derived.

It has been the usual practice in operating stills of the general type shown in FIG. 1 to introduce water into the evaporator 2 under very slight pressure of perhaps less than one-quarter pound per square inch above atmospheric pressure; whereas in the present invention heated water is taken from the cooling coil 12 through a tube 18, through a water level maintaining means 21, to be hereinafter discussed, to the evaporator 2 at 22. The water, therefore, is under pressure from the tap line and the amount passing into the evaporator 2 may be regulated by the valve 19 to maintain the water level at, for example, the level shown at 23, although in other methods of operation later mentioned, the water level may vary, as between levels 23 and 24. In prior art devices with a pressure of about one-quarter pound per square inch above atmospheric pressure in the evaporator section 2, a pressure very close to atmospheric pressure appears in the condenser 10. As H$_2$O gas condenses, this pressure within the condenser 10 varies or pulsates, often dropping below atmospheric pressure thus causing the condenser to inhale or draw in outside air which tends to contaminate the condensate. The relatively high level pressure within the condenser 10 of the present invention eliminates all possibilities of such inhalation.

The temperatures and pressures of the present invention have another advantage. Tap water contains living organisms, as bacteria and the like, many of which are not destroyed below 212° F. When the temperature in a liquid in which such organisms reside is raised and maintained above 212° F. for an appreciable time, however, the organisms are destroyed and decompose to their constituent parts including gases and solid deposits. Since the temperature in prior art stills is never much above 212° F. and, indeed, is below 212° F. in some parts thereof, it is often necessary to sterilize distilled water for many uses thereof, which necessitates using a sterilizer after the still. The present still and method, however, effects a sterilization of the water in the distilling process. This is true because, contrary to prior practice, the tap water is evaporated at a temperature that is sufficiently high to destroy and within a relatively short time decompose organisms and, further, this high temperature is maintained in the condenser, thus destroying organisms there, and no inhalation of environmental air into the condenser is allowed. In addition, in the batch operation, to be hereinafter discussed, organisms are flushed from the system, in the early part of the distillation cycle, to a storage means wherein is stored distilled water of lesser quality, or to waste.

A very high purity water may be obtained by operating the still on the batch basis, previously mentioned, or on what is referred to hereinafter as a continuous-batch basis. The batch operation is effected by raising the level of the water in the evaporator 2 to a predetermined high level 24 and thereafter discontinuing the flow. The water is changed to a vapor in the manner before described. The initial vapor contains a relatively high level of unwanted gases, but within a short time the unwanted gases mostly are vented off and the vapor thereafter is mostly H$_2$O gas. When the water level in the evaporator 2 due to the removal of the vapors has lowered to a predetermined low level 23, tap water is again introduced to raise the level in the evaporator section to the predetermined high level 24. The level of the water in the evaporator 2 may be maintained automatically between 23 and 24 in a continuous-batch operation by the level maintaining means 21, which may be a Vaporstat controller manufactured by Minneapolis-Honeywell Regulator Company of Minneapolis, Minn. In either the batch operation or the continuous-batch operation, water having a resistivity of approximately 15 million ohm-cm. may be obtained.

The condenser herein illustrated is an elongated shell member and extends longitudinally and slightly downward from the pipe 11 toward the free end 10'. The distillate or condensate is drained through a tube 26 and a valve 27, shown in detail schematically in FIG. 2, which alternately directs the condensate to storage means A or B through tubes 29 or 28, respectively. Whether condensate passes to the storage means A or B depends upon the position of a valve member 35. The valve member 35 is shown inclined to the left to effect passage of condensate to the storage means B. A coil 36, when energized to a predetermined level, maintains the valve 35 in the position shown. When the coil 36 is energized below the predetermined level, the valve 35 pivots about point 35' and inclines to the right due to the pull of a spring 37 to cause condensate to pass to the storage means A. Current to energize the coil 36 passes from a battery 34 (or a rectified alternating-current voltage of constant magnitude), through a conductor 31 to the coil 36, thence, by a further conductor 30 to a plate 32, across the condensate to a further plate 33 and thence to the battery. The amount of current passing between the plates 32 and 33 depends upon the purity of the condensate in the tube 26. It is, therefore, possible to direct condensate selectively alternately to the storage means A or the storage means B depending upon the purity of the condensate. This is particularly useful in connection with the batch or continuous-batch operation before mentioned as the initial distillate is often of lower than desired purity upon refilling of the evaporator section to the level 24. After some evaporation the purity of the distillate increases. The initial distillate may be directed to, for example, the storage means A. When a predetermined high level of purity is reached the distillate may be thereafter directed to the storage means B.

One further method of batch operation, that has been found to be particularly useful in the destruction of bacteria or the like and the decomposition of the said bacteria and other temperature sensitive contaminants, will now be described. The tap water is introduced into the evaporator 2 to the predetermined high level 24, in the manner previously outlined, and thereafter the inflow of tap water is discontinued. Heat is applied to the water in the evaporator 2 by the coils 3 to change the water therein to a vapor containing H$_2$O gas and unwanted gases. A manual valve 38 within the pipe 7 is closed by turning the knob thereof to restrict any flow of the vapor from the evaporator 2 to the condenser 10. The input heat is controlled, manually or automatically, to maintain the temperature and corresponding pressure in the evaporator at a predetermined high level long enough to destroy and decompose the bacteria and the other temperature sensitive contaminants. It has been found that a temperature in the evaporator 2 of 250° F. with a corresponding pressure of 15 pounds per square inch above atmospheric pressure maintained for thirty minutes substantially effects this decomposition. The valve 38 is then opened to enable flow of the vapor to the condenser. The initial vapor contains a fairly high amount of the unwanted gases and most of this initial flow to the condenser vents through the opening 17. Thereafter the temperature between 213° F. and 233° F. and the pressure between 0.3 and 7.3 before mentioned are maintained in the condenser. Most of the unwanted gases may be vented to the atmosphere from the evaporator 2 through an adjustable vent 39 similar to the needle valve 17', thus eliminating the possibility of contamination of the condensing area. The manual valve 38 may be replaced by a solenoid valve and the opening 17 may be closed during the thirty minute decomposing cycle to eliminate inhalation of air into the condenser. Both the valve 38 and a solenoid valve associated with the opening 17 may be opened simultaneously at the end of the 30-minute cycle.

Modifications of the present invention will occur to those skilled in the art and all such modifications are considered to fall within the spirit and scope of the present invention as defined in the appended claims.

What is claimed is:

1. A method of providing very high purity water from impure water containing unwanted dissolved gases, that comprises applying heat to the impure water at a temperature above the boiling point of water at the ambient atmospheric pressure to change the impure water to a vapor containing water vapor and the unwanted gases, passing the water vapor and unwanted gases to a condenser and condensing a substantial portion of the water vapor to a liquid condensate in the condenser while continually maintaining the temperature in the condenser above the said boiling point of water and the pressure in the condenser above the said ambient atmospheric pressure, but below a level at which substantially all of the water vapor remains in the vapor state, and while venting the unwanted gases directly from the condenser to the atmosphere and away from the condensate during the condensing to separate them from the condensate and to prevent the gases from dissolving in the condensate, and simultaneously draining the condensate to a storage container, said unwanted gases being vented along a path separate from the path of the vapor entering the condenser and the path of the condensate draining from the condenser.

2. The method of claim 1, said heat being applied to said impure water in an evaporator, the pressure in said condenser being continually maintained above said ambient atmospheric pressure and the temperature in said condenser being continually maintained above the said boiling point by the heat imparted to said vapor in the evaporator.

3. The method of claim 1, said temperature in said condenser being maintained substantially between 213° F. and 233° F. and said pressure in said condenser being maintained substantially between 0.3 and 7.3 pounds per square inch above said ambient atmospheric pressure.

4. The method of claim 1, wherein said method further comprises measuring the level of purity of said condensate and automatically directing the condensate to alternate storage containers in accordance with the measured level of purity of the condensate.

5. The method of claim 1, said heat being applied to said impure water in an evaporator and said impure water being introduced into said evaporator under pressure to a predetermined high level and thereafter the inflow of the impure water being discontinued until the vaporization of the water in the evaporator has lowered the level of the water to a predetermined low level.

6. The method of claim 1, said heat being applied to said impure water in an evaporator, the heated water and vapor being initially retained in the evaporator and maintained under substantially high temperature and pressure for a predetermined long time to destroy and decompose organisms or the like in the impure water, then the vapor being vented to the atmosphere to flush unwanted gases and other impurities, while the pressure in said evaporator is maintained above the said ambient atmospheric pressure, and the application of heat to the remaining water being continued to change the same to vapor which is then supplied to said condenser.

7. The method of claim 6, the said high temperature and pressure being substantially 250° F. and 15 pounds per square inch above said ambient atmospheric pressure, respectively, the said predetermined long time being substantially thirty minutes.

8. A method of providing very high purity from impure water containing unwanted dissolved gases, that comprises applying heat to the impure water at a temperature above the boiling point of water at the ambient atmospheric pressure to change the impure water to a vapor containing water vapor and the unwanted gases, passing only the water vapor and unwanted gases to a condenser, circulating a coolant in heat exchange relationship with said condenser, condensing a substantial portion of the water vapor in the condenser to a liquid condensate, controlling the circulation of said coolant to maintain the temperature in the condenser above the said boiling point of water throughout the said condensing of the water vapor, venting the unwanted gases directly from the said condenser and away from the said condensate during the said condensing to separate said unwanted gases from the condensate and to prevent the gases from dissolving in the condensate, controlling the venting of the unwanted gases to maintain the pressure in the condenser above the said ambient atmospheric pressure throughout the said condensing, and draining the condensate to a storage container, the said unwanted gases being vented along a path separate from the path of the vapor entering the condenser and the path of the condensate draining from the condenser, said water vapor being removed from said condenser only as said condensate or with the venting of said unwanted gases.

References Cited

UNITED STATES PATENTS

| 524,887 | 8/1894 | Craney | 203—10 |
| 698,724 | 4/1902 | Murphy | 203—10X |
| 970,051 | 9/1910 | Hiller | 203—11 |
| 1,183,142 | 5/1916 | Underwood | 203—11 |
| 2,301,835 | 11/1942 | White et al. | 203—27 |
| 2,816,064 | 12/1957 | Smith | 203—10 |
| 3,074,216 | 1/1963 | Loebel | 203—10X |
| 3,091,577 | 5/1963 | Pequignot | 202—189 |
| 3,235,469 | 2/1966 | Parke | 203—2 |
| 3,298,929 | 1/1967 | Smith | 202—190 |

FOREIGN PATENTS

| 26,342 | 1898 | Great Britain | 203—10 |
| 918,714 | 2/1963 | Great Britain | 203—10 |

NORMAN YUDKOFF, Primary Examiner

F. E. DRUMMOND, Assistant Examiner

U.S. Cl. X.R.

202—181, 182, 189